US008694398B2

United States Patent

(12) United States Patent
Kemp, II et al.
(10) Patent No.: US 8,694,398 B2
(45) Date of Patent: *Apr. 8, 2014

(54) CLICK BASED TRADING WITH MARKET DEPTH DISPLAY

(75) Inventors: Gary Allan Kemp, II, Winnetka, IL (US); Jens-Uwe Schluetter, Evanston, IL (US)

(73) Assignee: Trading Technologies International, Inc, Chicago, IL (US)

( * ) Notice: Subject to any disclaimer, the term of this patent is extended or adjusted under 35 U.S.C. 154(b) by 731 days.

This patent is subject to a terminal disclaimer.

(21) Appl. No.: 11/415,189

(22) Filed: May 2, 2006

(65) Prior Publication Data

US 2006/0195389 A1 Aug. 31, 2006

Related U.S. Application Data

(63) Continuation of application No. 11/061,554, filed on Feb. 18, 2005, now Pat. No. 7,505,932, which is a continuation of application No. 09/589,751, filed on Jun. 9, 2000, now Pat. No. 6,938,011.

(60) Provisional application No. 60/186,322, filed on Mar. 2, 2000.

(51) Int. Cl.
*G06Q 40/00* (2012.01)

(52) U.S. Cl.
USPC .............................................. 705/35; 705/37

(58) Field of Classification Search
USPC ..................................................... 705/35-45
See application file for complete search history.

(56) References Cited

U.S. PATENT DOCUMENTS

| | | | |
|---|---|---|---|
| 4,674,044 A | 6/1987 | Kalmus et al. |
| 4,750,135 A | 6/1988 | Boilen |
| 4,903,201 A | 2/1990 | Wagner |
| 5,038,284 A | 8/1991 | Kramer |
| 5,077,665 A | 12/1991 | Silverman et al. |
| 5,101,353 A | 3/1992 | Lupien et al. |
| 5,136,501 A | 8/1992 | Silverman et al. |
| 5,243,331 A | 9/1993 | McCausland et al. |
| 5,270,922 A | 12/1993 | Higgins |
| 5,297,031 A | 3/1994 | Gutterman et al. |

(Continued)

FOREIGN PATENT DOCUMENTS

| | | |
|---|---|---|
| EP | 1319211 B1 | 4/2005 |
| JP | H7-506916 A | 7/1995 |

(Continued)

OTHER PUBLICATIONS www.tradingtechnologies.com/products/xtrade_full.html and /ttnews.com.

(Continued)

*Primary Examiner* — Richard C Weisberger

(74) *Attorney, Agent, or Firm* — McDonnell Boehnen Hulbert & Berghoff LLP

(57) ABSTRACT

A method and system for reducing the time it takes for a trader to place a trade when electronically trading commodities on an exchange, thus increasing the likelihood that the trader will have orders filled at desirable prices and quantities. Click based trading, as described herein and specifically the "Click" and "Dime" methods of the present invention, enables a trader to execute single mouse click trades for large volumes of commodities at a price within a pre-specified range.

16 Claims, 8 Drawing Sheets

(56) References Cited

U.S. PATENT DOCUMENTS

| | | | |
|---|---|---|---|
| 5,297,032 | A | 3/1994 | Trojan et al. |
| 5,339,392 | A | 8/1994 | Risberg et al. |
| 5,619,631 | A | 4/1997 | Schott |
| 5,689,651 | A | 11/1997 | Lozman |
| 5,689,652 | A | 11/1997 | Lupien et al. |
| 5,774,877 | A | 6/1998 | Patterson, Jr. et al. |
| 5,793,301 | A | 8/1998 | Patterson, Jr. et al. |
| 5,797,002 | A | 8/1998 | Patterson, Jr. et al. |
| 5,809,483 | A | 9/1998 | Broka et al. |
| 5,845,266 | A | 12/1998 | Lupien et al. |
| 5,915,245 | A | 6/1999 | Patterson, Jr. et al. |
| 5,924,082 | A | 7/1999 | Silverman et al. |
| 5,924,083 | A | 7/1999 | Silverman et al. |
| 5,946,667 | A | 8/1999 | Tull, Jr. et al. |
| 5,960,411 | A | 9/1999 | Hartman et al. |
| 5,963,923 | A | 10/1999 | Garber |
| 5,966,139 | A | 10/1999 | Anupam et al. |
| 6,012,046 | A | 1/2000 | Lupien et al. |
| 6,014,643 | A | 1/2000 | Minton |
| 6,035,287 | A | 3/2000 | Stallaert et al. |
| 6,098,051 | A | 8/2000 | Lupien et al. |
| 6,115,698 | A | 9/2000 | Tuck et al. |
| 6,131,087 | A | 10/2000 | Luke et al. |
| 6,134,535 | A | 10/2000 | Belzberg |
| 6,188,403 | B1 | 2/2001 | Sacerdoti et al. |
| 6,195,647 | B1 | 2/2001 | Martyn et al. |
| 6,272,474 | B1 | 8/2001 | Garcia |
| 6,278,982 | B1 | 8/2001 | Korhammer et al. |
| 6,282,521 | B1 | 8/2001 | Howorka |
| 6,343,278 | B1 | 1/2002 | Jain |
| 6,366,293 | B1 | 4/2002 | Hamilton et al. |
| 6,408,282 | B1 | 6/2002 | Buist |
| 6,421,653 | B1 | 7/2002 | May et al. |
| 6,766,304 | B2 | 7/2004 | Kemp, II et al. |
| 6,772,132 | B1 | 8/2004 | Kemp, II et al. |
| 6,938,011 | B1 | 8/2005 | Kemp et al. |
| 6,993,504 | B1 | 1/2006 | Friesen et al. |
| 7,212,999 | B2 | 5/2007 | Friesen et al. |
| 7,505,932 | B2 | 3/2009 | Kemp, II et al. |
| 7,533,056 | B2 | 5/2009 | Friesen et al. |
| 7,676,411 | B2 | 3/2010 | Kemp, II et al. |
| 7,693,768 | B2 | 4/2010 | Kemp, II et al. |
| 7,720,742 | B1 | 5/2010 | Mauro et al. |
| 7,725,382 | B2 | 5/2010 | Kemp, II et al. |
| 7,813,996 | B2 | 10/2010 | Kemp, II et al. |
| 7,904,374 | B2 | 3/2011 | Kemp, II et al. |
| 2002/0023038 | A1 | 2/2002 | Fritsch et al. |
| 2002/0055899 | A1 | 5/2002 | Williams |
| 2002/0138401 | A1 | 9/2002 | Allen et al. |
| 2003/0097325 | A1 | 5/2003 | Freisen et al. |
| 2005/0149429 | A1 | 7/2005 | Kemp et al. |
| 2006/0195388 | A1 | 8/2006 | Kemp, II et al. |
| 2007/0038554 | A1 | 2/2007 | Kemp, II et al. |
| 2007/0038555 | A1 | 2/2007 | Kemp, II et al. |
| 2007/0038556 | A1 | 2/2007 | Kemp, II et al. |
| 2007/0038557 | A1 | 2/2007 | Kemp, II et al. |
| 2011/0153486 | A1 | 6/2011 | Kemp, II et al. |

FOREIGN PATENT DOCUMENTS

| | | | |
|---|---|---|---|
| JP | 10-301870 | A | 11/1998 |
| JP | 11-161717 | A | 6/1999 |
| WO | 91/14231 | A1 | 9/1991 |
| WO | 93/15467 | A | 8/1993 |
| WO | WO 95/26005 | | 9/1995 |
| WO | 98/13778 | A1 | 4/1998 |
| WO | WO 98/49639 | | 11/1998 |
| WO | 99/13424 | A1 | 3/1999 |
| WO | WO 99/19821 | | 4/1999 |
| WO | WO 99/30259 | | 6/1999 |
| WO | WO 99/53424 | | 10/1999 |
| WO | WO 00/52619 | | 9/2000 |
| WO | WO 00/62187 | | 10/2000 |
| WO | 00/65510 | | 11/2000 |
| WO | WO 00/65510 | | 11/2000 |
| WO | 01/16830 | | 3/2001 |
| WO | 01/22315 | | 3/2001 |
| WO | WO 01/16830 | | 3/2001 |
| WO | WO 01/16852 | | 3/2001 |
| WO | WO 01/22315 | | 3/2001 |
| WO | WO 01/88808 | | 11/2001 |
| WO | 00/62187 | A3 | 12/2001 |
| WO | 01/22315 | A3 | 1/2002 |
| WO | 01/16852 | A8 | 6/2002 |

OTHER PUBLICATIONS

Kharouf, a trading room with a view, Futures 27, Nov. 11, 1998, 6 pages.
USPTO Presentation, NASDAQ, Nov. 8, 2001, enclosed pp. 1-13.
eSpeed's and Ecco's Answers to Plaintiff's Eighth Set of Interrogatories, Aug. 4, 2006.
eSpeed and Ecco's Supplemental Answers to Plaintiff's First, Third, Seventh, Eighth, and Ninth Set of Interrogatories, May 25, 2007.
Defendant GL Trade Americas, Inc's Supplemental Responses and Objections to Interrogatory Nos. 5,17, and 18, Jul. 24, 2006.
eSpeed's Objections and Answers to Plaintiff's Third Set of Interrogatories to Defendant eSpeed, May 12, 2005.
GL WIN Version 4.50, Mar. 3, 1999, OX 538, G 107459-G 107480, DTX 538.
Trading Pad User Manual, Aug. 10, 1999, OX 539, G 112123-G 112131, DTX 539.
Email from Wattier to M. Cartier attaching Matif VF: V4.50 manual, Mar. 30, 1998, OX 592, MC000046-MC000116, DTX 592.
User Guide V4.60 LIFFE Connect for Futures by GL Trade, Jun. 1999, OX 605, G 123548-G 123603, DTX 605.
"A System and Method for Conducting Security Transactions Over a Computer Network", Mauro & Buist, Mar. 1, 1999, DX 196, eS 066150-eS 066229, DTX 196.
RCG's Presentation re WitCapital, Apr. 22, 2004, OX 208, RCG 000635-RCG 000663, DTX 208.
Mauro, Certified U.S. Appl. No. 09/292,552, Apr. 15, 1999, OX 209, eS 065994-eS 066149.
Various declarations Re: U.S. Appl. No. 09/292,552, Nov. 3, 2003, OX 284, TT 099877-TT 099907, DTX 284.
Evenstreet Presentation prepared for National Discount Brokers, 1999, DX 301, CM 006787-CM 006817, DTX 301.
WIT DSM user interface instructions, Aug. 6, 1998, OX 427, CM 006591-CM 006632, DTX 427.
Presentation re WIT DSM user interface Trade4.ppt, Oct. 12, 1998, DX 430, CM 008265-CM 008330, DTX 430.
WIT DSM Presentation re Information display and decision variables, Dec. 20, 1998, DX 431, CM 004334-CM 004347, DTX 431.
Evenstreet Presentation prepared for Flatiron Partners, 1999, OX 437, CM 007139-CM 007172, DTX 437.
WIT Capital digital trading facility presentation to Goldman Sachs, DX 438, CM 004523-CM 004547, DTX 438.
WIT Capital Digital trading facility presentation to PaineWebber, Inc., OX 439, DTX 439.
WIT Capital after hours trading system, Mauro, Mar. 19, 1999, OX 440, CM 009028-CM 009059, DTX 440.
WIT Capital Corporation digital trading facility presentation, Mar. 1999, OX 441, DTX 441.
WIT Capital pdf operator manual for Digital trading facility, 1999, OX 442, CM 00651 0-CM 006513, DTX 442.
Overview re Digital trading facility, OX 443, CM 006315-CM 006344, DTX 443.
Utility Patent Application Transmittal Re: Computer Trading System, Method and Interface, Apr. 15, 1999, Mauro, Kleia, and Buist, PX368.
Photocopy of Disks containing exhibits A and B to declaration of W. Buist, PX366.
SISS Functional specifications version 2.1, Feb. 16, 1988, OX 445, DTX 445.
Overview re SPATS; the Electronic Broker, OX 446, DTX 446.
Status review specialist support system study NYSE, Apr. 10, 1986, OX 447, DTX 447.

(56) References Cited

OTHER PUBLICATIONS

Declaration of W. Buist re: WIT DSM System, Apr. 26, 2006, PX 365, DTX 1777.
Sample screens of APT system, OX 150, DTX 150.
Photo of trader w/ APT screen, OX 151, LI FFE 00167-LI FFE 00168, DTX 151.
APT User Guide, Jan. 1994, OX 152, LIFFE 000262-LIFFE 000363, DTX 152.
LIFFE guide/pamphlet, OX 148, DTX 148 (pre-1994).
Release Notes—Market Trader V5.2a, Mar. 18, 1999, OX 617, G 118137-G 118152,DTX617.
Market Trader—Nikkel 225 & Nikkel 300 Index options and Index futures trading users guide, Mar. 20, 1998, OX 618, G1 00444-G1 00462, DTX 618.
Midas Kapiti Delivery Note and Release Note—Market Trader V5.2b, Mar. 31, 1999, OX 619, G 096511-G 096527, DTX 619.
Midas Kapiti Release Notes—Market Trader V5.2e, Apr. 12, 1999, OX 620, G 096694-G 096711, DTX 620.
Midas Kapiti Release Notes—Market Trader V5.2, OX 621, G 096712-G 096727, DTX 621, OS/26/99.
Midas Kapiti Release Notes—Market Trader V5.2e, OX 622, G 096728-G 096754, DTX 622, Jun. 1, 1999.
Midas Kapiti Delivery Note and Release Note—Market Trader V5.2e, OX 623, G 105641-G 105667, DTX 623, May 26, 1999.
Drawing of 1997 TSE terminal by H. Kida, OX 624, DTX 624.
Directory of Software Solutions for LIFFE Connect, 02/0099, OX 156, DTX 156.
ScreenShots: Patsystem "Canned" Demo, Feb. 1997, OX 120, PATS 00545-PATS 00559, DTX 120.
PTS Client Version 2.1 F, OX 119, PATS 00067-PATS 00082, DTX 119.
PTS trading application Version 1.1 Beta H.1, Mar. 31, 1998, OX 118, PATS 00560-PATS 00560, DTX 118.
Directory of Software Solutions for LI FFE Connect, Issue 1, Oct. 1998, OX 155, DTX 155.
Directory of Software Solutions for LIFFE Connect, Issue 3, Jun. 10, 1999, OX 157, DTX 157.
Trading Technologies Trader System User Documentation, Apr. 1, 1998, Release 3.10, OX 3, TT 015867-TT 015955, DTX 3.
Aurora Chicago Board of Trade Brochure, 1990, ES0021230-ES0021241.
Ecco Consulting Study Report MEFF Software Systems, Mar. 17, 1999, ES0060578-ES0060591.
Osaka Stock Exchange Manual (Japanese Document), Apr. 1996 REFCOOO09773-REFCOOO09826.
TSE Manual (Japanese Document), Nov. 15, 2005, DX179, TSE647-995, w/certified translation e562258-62366 [TSE609-647, 694-711, 714-721, 735-736, 749-756, 759-760, 779-782, 784-810, 982-995].
Final Detailed Design Document NYMEX ACCESS, May 5, 1992, eSOO03127-eSOO03541.
The Application Program Interface (API) Reference Manual for LIFFE Connect, Release 3.0, Sep. 1998, DDX 159, DTX 159, eSOO060055-eSOO060145.
The Application Program Interface (API) Reference Manual for LIFFE Connect, Release 3.2, Dec. 1998, DDX 161, DTX 161, eS00060239-eS00060331.
The Application Program Interface (API) Reference Manual for LIFFE Connect, Release 3.3, Jan. 1999, DDX 162, DTX 162, eSOO059959-eSOO060054.
The Application Program Interface (API) Reference Manual for LIFFE Connect, Release 2.7, Sep. 1998, DDX 163, DTX 163, eSOO059868-eSOO059958.
OM CLICK Trade User's Guide for Windows NT, Oct. 1998, eSOO064671-eSOO064773.
GLOBEX Members Handbook, Jun. 1992, DX632, DTX632, eS006974-eS0069818.
The Complete GLOBEX2 Handbook, May 1998, DX635, DTX635, CME-E001 0679-001 0891.
The Complete GLOBEX2 Handbook, Jul. 1998, DX637, DTX637, CME-E 014048-CME-E 014286.
MINEX Service Outline User Test/Orientation, Sep. 1992, eS0064647-eS0064670.
ORC Instructions for Use Version 2.2.8., 1999, eS0064775-eS0032572.
Interactive Brokers, "Trade Futures Online with Interactive Brokers", May 9, 2005, eS0032571-eS0032572.
Nicholas Economides, "Electronic Call Market Trading", Journal of Portfolio Management, Feb. 1995, eS0069585-eS006961 0.
GL Trading Pad Manual, G0020819-G0020826 (1999).
TradePad Instructions (French), G0025748-G0025749 (date unavailable).
TradePad.vsd Document, Feb. 9, 1999, G011169-G0111670.
Trading pad.doc Document, Jan. 26, 1999, G0111671-G0111672.
GL WIN et Logiciels complementaires (French), Oct. 1999, G009121-G009486.
GL WIN et Logiciels complementaires (French), Jul. 1999, G009875-G010238.
Memo re: Dual ACCESS Version 4.5 release, Mar. 21, 1999, G0022956-G0022959.
tradepad.txt (French), Mar. 8, 2000, G0025616-G0025618.
GL Enhancements Software Version 4.11 f, Oct. 29, 1998, G0060853-G0060854.
GL Enhancements Update, Jan. 27, 1999, G01 01682-G01 01688.
LIFFE Connect Futures Release Note 050399.doc, Mar. 3, 1998, G0111402-G0111407.
TradingPad.doc, Apr. 30, 1999, G0112117-G0112122.
TradingPadUserManual.doc, Aug. 10, 1999, G0112123-G0112131.
GL WIN Version 4.51, G0118856-G0118865.
GL Trade Presentation (French), Apr. 25, 1999, G0118989-G0119044.
LIFFE CONNECT FUTURES Functional Technical Issues to Resolve, Apr. 12, 2007, G0119049-G0119050.
LIFFE CONNECT for Equity Options User Guide v4.30, Nov. 1998, G0119052-G0119086.
Member Participation in the Futures Market, Apr. 12, 1999, G0119196-G0119197.
Email from Patricia Gauthier to Sam Page, Jan. 25, 1999, G0119377-G0119380.
LIFFE Connect ISV Circular No. 001.99, Jan. 8, 1999, G0119566-G0119568.
LIFFE Connect ISV Circular No. 14.99, Mar. 2, 1999, G0119583-G0119590.
LIFFE Connect ISV Circular No. 004.99,Jan. 15, 1999, G119615-G0119616.
LIFFE Connect ISV Circular No. 001.99, Jan. 15, 1999, G0119617-G0119618.
LIFFE Connect ISV Circular No. 008.98, Dec. 28, 1998, G0119631-G0119632.
Screenshot of GL TradePad, G0119660.
LIFFE CONNECT for Futures Schedule for Project Deliverables, Feb. 4, 1999, G0119681-G0119682.
LIFFE CONNECT for Futures-Project Update #1, Meeting of Jan. 11, 1999, G0119691-G0119697.
LIFFE CONNECT for FUTURES: Project Update 2, Meeting of Feb. 10, 1999, G0119698-G0119704.
LIFFE CONNECT for FUTURES: Project Summary: Apr. 19, 1999, G0119705-G0119717.
Functional Enhancements for LIFEE CONNECT for FUTURES Project, Apr. 12, 1999, G0119718-G0119724.
Functional Enhancements for LIFEE CONNECT for FUTURES Project, Apr. 12, 1999, G0119725-G0119745.
Functional Enhancements for LIFEE CONNECT for Futures Project, Mar. 3, 1999.
Installation, Market Entry Test, and Technical Dress Rehearsal Summary, Feb. 23, 1999.
GL Trade Checklist-Installation Requirements for FUTURES, Jan. 1999, G0119795-G0119798.
Cahier de charges.doc, Feb. 9, 1999, G0111752-G0111758.
Keyboard example, Feb. 3, 2006, G007308-G007310.
GL Brochure, G0021652-21658.
GL Cost and Services, 1998, G01 08876.
GL Win Summary (French), Jun. 1998, G0091 004-G0091 046.

(56) References Cited

OTHER PUBLICATIONS

Swiss Exchange SWX—TS User Manual, Dec. 31, 1998, DTX 2215, eS0032293-eS0032547.
Screen No. 100—Order Book & Order Entry 1 (Single View), eS060637-eS060639.
GLOBEX User Guide, Jan. 1997, DDX 633, DTX 633, eS069819-eS070081.
QuickTrade Document and Brochure, G021027-21031.
LIFFE CONNECT for Futures User Guide v4.5, Jun. 1999, G0025751-25806.
GL Version 4.70 (French Version), Jan. 5, 2000, G0026505-26533.
GL Version 4.70 (English Version), Jan. 5, 2000, G0020593-20621.
GL WIN and Related Software Manual, Sep. 11, 2000, 1) G0025251-25615.
GL WIN and Related Software Manual, 2) G0025942-26267.
GL WIN and Related Software Manual, 3) GO1 0239-1 061 0.
GL WIN et Logiciels complementaires (French), GOO09495-9874.
Internal Product News doc on QuickTrade, G0020468-20471.
"Introducing the Company: GL Trade" product offerings and slide presentation (to Reuters), G0026534-26559.
GL Product Leaflet Re: Mosaic, G0022529-22530.
Thomson Financial leaflet, Sep. 2003, G0022445-22450.
LIFFE CONNECT for Futures leaflet, G0023885-23888 (Jan. 1999).
TSE Japanese Document, pp. 4-15.
TSE Japanese Document, pp. 6-15.
Megumi Miyoshi, Japanese Patent Application No. 2001-564025, Apr. 18, 2000.
"Amazon.com Catapults Electronic Commerce to Next Level with Powerful New Features," Amazon.com Press Release, Sep. 23, 1997, DTX1034, DezmelykOOOO12-13.
Apple Advertisement, Scientific American, Sep. 1984, Scientific American Inc. NY, NY DezmelykOOO014-33.
Memo Re: Downloading the Terminal Program, Aug. 18, 2005.
"Specialist vs. Saitori: Market-Making in New York and Tokyo", Richard Lindsay and Ulrike Schaede, DTX 1170, Jul.-Aug. 1992, SilvermanOO0494-SilvermanOO0506.
"Building for Excellence", MINEX Brochure, DTX 1153, SilvermanOO0330-SilvermanOO0334.
Chicago Mercantile Exchange (CME) Brochure, DTX1163, SilvermanOO0406-SilvermanOO0407.
MEFF Renta Fija Manual, DTX 1165, Oct. 1997, SilvermanOO0410-SilvermanOO0473.
O'Hara and Oldfield, "The Microeconomics of Market Making", Journal of Financial and Quantitative Analysis, Dec. 1986, DTX 1169 Silverman000478-SilvermanOO0493.
Terminal Use Manual—Windows NT Version, Tokyo International Financial Futures Exchange (TIFFE), 1994, Silverman002552-Silverman002616, DTX 1226.
USPTO Press Release, "Electronic Patent Application Records Replace Paper Files at USPTO", DTX 2285, Sep. 19, 2007.
Memorandum Opinion and Order Re: '132 and '304 Claim Construction [425], Oct. 31, 2006.
Memorandum Opinion and Order Re: TT's Motion for Clarification [475], Feb. 21, 2007.
Memorandum Opinion and Order Re: Non-Infringement [708], Jun. 20, 2007.
Memorandum Opinion and Order Re: Motions for Reconsideration [875], Aug. 27, 2007.
Deposition testimony of Marcel Tchitchiama dated May 10, 2007-May 11, 2007 with DDX 156-157; DDX 168; DDX 384-85; DDX 538; DDX 592-93A; DDX 595-98; DDX 602-06; DDX 608-11 DTX 494; POX 503; POX 506; POX 612.
Deposition testimony of Neil Treloar dated Jun. 19, 2007 with DDX 384; DDX 539-39A; DDX 724; DDX 726; POX 492; POX 750-752.
Trial testimony of Neil Treloar dated Sep. 21, 2007 and Sep. 24, 2007 with DTX 2040-2042.
Trial testimony of Gerard Varjacques dated Sep. 28, 2007 with PTX 509-510 and PTX 513.
Deposition testimony of Amy Watson dated Jun. 12, 2007 with DDX 626A; DDX 700 and POX 636.
Deposition testimony of Barbara Wattiez dated Jun. 16, 2007 with DDX 719-723.
Trial testimony of Barbara Wattiez dated Sep. 28, 2007 with DTX 592-593A; DTX 597-598; DTX 718-719; DTX 722.
Deposition testimony of Christopher Buist dated Jun. 22, 2006 with POX 358-364 and DDX 283-284.
Deposition testimony of Walter Buist dated Jun. 23, 2006 with DDX 315; POX 310-315; POX 365 and POX 368-370.
Digital trading facility weekly operations meeting outline, OX 444, DTX 444, CM 006661-CM 006661, May 10, 1999.
Chart re DSM QA Test Plain—project plan in progress, OX 432, DTX 432, Nov. 4, 1998.
User interface design specification for WIT capital digital stock market, OX 433, DTX 433 CM 008441-CM 008478, Jan. 18, 1999.
Updated negotiations design to E. Lang from C. Mauro for review and approval prior to patent application, OX 434, CM 008410-CM 008414, DTX 434, Jan. 18, 1999.
Notes re final additions/revisions, OX 435, CM 007949-CM 007955, DTX 435, Apr. 2, 1999.
Position paper: On-line training and customer acquisition; WIT Capital DSM product launch and related schedule to E. Lang, DX 436, DTX 436, CM 006580-CM 006590, Feb. 22, 1999.
Meeting outline, OX 428, CM 00750-CM 007501, DTX 428, Sep. 11, 1998.
Presentation re WIT Capital Digital stock market Phase 1 usability and customer response testing: Preliminary report of findings, DX 429, CM 007446-CM 007466, May 1, 2006.
WIT Capital limit order book to L. Forrest from C. Mauro, OX 425, CM 007382-CM 007411, DTX 425, Apr. 20, 1998.
APT Trading Procedures (ATOM Version) of LI FFE, Apr. 3, 2001, Opposition EP 1 319211 B1 Exhibit 9B.
APTplus Trading Procedures, Dec. 28, 1995, Opposition EP 1 319211 B1 Exhibit 90.
IRIS Investment Support Systems Window Ad, Opposition EP 1 319211 B1 Exhibit 10.
Fig.2 Substitute Sheet (Rule 26), Opposition EP 1 319 211 B1 Exhibit 13A.
U.S. Appl. No. 60/186,322, Opposition EP 1 319211 B1 Exhibit 13B.
LIFFE's New Electronic Trading Platform for Futures, LIFFE 202-261, Opposition EP 1319211 B1 Exhibit 80.
TIFFE Internet Article, "New On-Screen Trading Terminals", E2 (circa 1998).
System for Buying and Selling Futures and Options Transaction Terminal Operational Guidelines, TSE Business Systems Dept., TSE00647-81 0, eS0622977-eS062366, D1 (2).
ORC Instructions for Use, Version 2.2.8., 1999.
Futures/Options Trading System Guidelines for Operating the Trading Terminals, TSE Business Systems Dept., TSE00628-643, eS062278-eS062293, 01 (3).
Securities Industries News, "TT Upgrades Software Platform", Aug. 28, 2000 (06).
Letter to EPO from Karl Barnfather Enclosing Notice of Opposition (form 2300.1) and Grounds of Opposition (Annex 1), Jan. 12, 2006.
Dow Jones & Reuters Factiva, "Firms Rush to Make LI FFE Connect Decision", Dec. 4, 1998, E6.
Dow Jones & Reuters Factiva, "Date Broadcasting Partners with Alltech Investment to Provide Customers with Online Trading", Feb. 25, 1999, E8.
Trading Pad Document (E3).
Japanese Document, TSE00609-627, Dec. 1, 2006 (E5), with Translation.
TT X-Trader Brochure, Dec. 1, 2006 (E7).
Letter to J. Walanski from EPO Re: Payment, Apr. 20, 2005.
Letter to J. Walanski from EPO Re: Decision to Grant TT Patent, Mar. 3, 2005.
German Document from Tick-IT GmbH Filing New European Opposition, Jan. 14, 2006.
Faxed German Document from Tick-IT GmbH Filing New European Opposition, Jan. 13, 2006.
Annex A to TT's Reply Brief.
Annex B to TT's Reply Brief.
Memo Re: Futures/Options Trading System and Japanese Patent Application No. 2001-564025 (Japanese), Aug. 18, 2005.

(56) References Cited

OTHER PUBLICATIONS

Patsystems News Rel. Nov. 6, 2001.
Court's ruling on no prior sale.
Memorandum Opinion and Order Re: No prior use.
Memorandum Opinion and Order Re: Inequitable Conduct.
Memorandum Opinion and Order Re: Court Reaffirming Priority.
Tokyo Stock Exchange, Publication 1, "Next-Generation Futures Options Trading System" (participants seminar materials), Sep. 1997 with English Translation.
REFCO English Translation of Tokyo Stock Exchange, Publication 1, "Next-Generation Futures Options Trading System" (participants seminar materials), Sep. 1997.
Tokyo Stock Exchange, Publication 2, "Futures/Options Trading System Guidelines for Operating the Trading Terminals", Aug. 1998 with English Translation.
REFCO English Translation of Tokyo Stock Exchange, Publication 2, "Futures/Options Trading System Guidelines for Operating the Trading Terminals" (participants seminar materials), Aug. 1998.
Tokyo Stock Exchange, Document 1, "Downloading the Terminal Program and Sending the Replacement for the Guidelines for Operating the Trading Terminals", Jan. 2000 with English Translation.
Tokyo Stock Exchange, Publication 3, "Tokyo Stock Exchange 50th Anniversary Book of Materials", Jul. 31, 2000 with English Translation.
REFCO English Translation Tokyo Stock Exchange, Publication 3, "Tokyo Stock Exchange $50^{th}$ Anniversary Book of Materials", Jul. 31, 2000.
English Translation of Tokyo Stock Exchange Offer Form, Apr. 18, 2005.
Information Offer Form, Apr. 18, 2005.
Notification of Information Offer Form, Jun. 3, 2005.
"APT: A trading system for the future," the London International Financial Futures Exchange (UFFE), 1990, 11 pages.
Trading Screen, INTEX of Bermuda, 1984, one page.
Weber, B.W., "Information Technology in the Major International Financial Markets," Stem School of Business, New York University, Apr. 7, 1993, pp. 1-43.
Trading Screen, TIFFE Exchange, circa 1989-1990, one page.
Trading Screen, MEFF Exchange, 1990, one page.
Cavaletti, C., "Order Routing,", Futures Magazine, Feb. 1997, pp. 68-70.
"AURORA: The most technologically advanced trading system available today," Chicago Board of Trade, 1989, 11 pages.
"One Click Trading Options," Trading Technologies, Inc., 1998, one page.
Trading Screen, SWX Exchange, 1990, two pages.
EPO Comments to Opposition to European Patent EP 1319211 dated Dec. 1, 2010 (67 pages).
Memorandum Opinion and Order issued by Judge Virginia M. Kendall in *Trading Technologies International, Inc.* v. *BCG Partners, Inc.*, Case 1:10-cv-00715, dated Feb. 9, 2012.
GL Trade, CAC and Stoxx Futures on MATIF NSC VF, User Information Notes, pp. 1-14, published by GL Trade, London, England, Mar. 15, 1999.
GL Trade, LIFFE Connect for Futures, User Guide, V4.50 Beta, pp. 1-24, published by GL Trade, London, England, Jan. 1999.
GL Trade, LIFFE Connect for Futures, User Guide, V4.50, pp. 1-39, published by GL Trade, London, England, Feb. 1999.
Gl Trade, LIFFE Connect for Futures, User Guide, V4.50, pp. 1-39, published by GL Trade, London, England, Mar. 1999.
GL Trade, LIFFE Connect for Futures, User Guide, V4.51, pp. 1-57, published by GL Trade, London, England, Jun. 1999.
eSpeed's Supplemental Invalidity Contentions, May 25, 2007.
eSpeed's Disclosure of Invalidity Contentions Pursuant to 35 USC 282, May 25, 2007.
Invalidity Contentions Re: TradePad Module (Letter Dated May 25, 2007).
Supplemental Invalidity Contentions Pursuant to 35 U.S.C. 282, Aug. 10, 2007.
Memorandum Opinion and Order Re: "Single Action" Ruling [963], Sep. 12, 2007.
Memorandum Opinion and Order Re: Preliminary Injunction [83], Feb. 9, 2005.
Memorandum Opinion and Order Re: eSpeed's Motion for Summary Judgment of Invalidity Denied [845], Aug. 21, 2007.
Memorandum Opinion and Order Re: TT's Motion to Preclude Prior Sale Defense Denied [873], Aug. 27, 2007.
Memorandum Opinion and Order Re: GL's Motion for Reconsideration Denied [994], Sep. 19, 2007.
Memorandum Opinion and Order Re: Priority Date [769], Jul. 12, 2007.
Memorandum Opinion and Order Re: Priority Date [1013], Sep. 25, 2007.
Memorandum Opinion and Order Re: Prior Public Use [835], Aug. 16, 2007.
Memorandum Opinion and Order Re: Defendant's Motion for Judgment as a Matter of Law on Indefiniteness [1141], Jan. 2, 2008.
Notification of Docket Entry Re: Defendants eSpeed's Motion for Judgment as a Matter of Law on Invalidity is denied [1140], Jan. 3, 2008.
Notification of Docket Entry Re: Defendant eSpeed's Motion for a New Trial is denied [1142], Jan. 3, 2008.
Memorandum Opinion and Order Re: Defendant's Motion for Judgment as a Matter of Law on Willfulness [1144], Jan. 3, 2008.
Deposition testimony of Hiroyuki Kida dated May 17, 2007 and May 18, 2007 with DDX 617-624, POX 519-524 and POX 531.
Trial testimony of Hiroyuki Kida dated Sep. 28, 2007 and Oct. 1, 2007 with DTX 617.
Deposition testimony of Atsushi Kawashima dated Nov. 21, 2005 with DDX 178-185.
Trial testimony of Atsushi Kawashima dated Sep. 26, 2007 with DTX 183.
Deposition testimony of Philip Carre dated Jun. 22, 2007, Sep. 6, 2007 & Sep. 13, 2007 with DDX 384-385; 473; 494; 527;537-541; 592; 593A; 595-598; 605; 626; 629; 719-723; 728; 732; 897-898; 896.
Deposition testimony of Michael Cartier dated May 9, 2007 with DDX 587-588; DDX 592-593A and POX 498-500.
Deposition testimony of Cristina Dobson dated May 18, 2007 with DDX 625-635; DDX 637; POX 533 and POX 535.
Deposition testimony of Nicholas Garrow dated Jun. 14, 2007 with DDX 116 and DDX 592.
Trial testimony of Nicholas Garrow (via expert witness) dated Oct. 2, 2007.
Deposition testimony of Michael Glista dated Feb. 20, 2007 with DDX 382-386.
Trial testimony of Michael Glista dated Sep. 24, 2007 and Sep. 25, 2007 with DTX 382-386; DTX 524; DTX 570; DTX 579; DTX 592; DTX 3020; DTX 3050; DTX 3057; DTX 3110; PTX 1993; PTX 2065; PTX 2092; PTX 2094.
Deposition testimony of Laurent Havard dated Apr. 24-26, 2007, May 12, 2007, Jun. 21, 2007 and Sep. 5, 2007 with DDX 506; DDX 508; DDX 517; DDX 539; DDX 551-568; DDX 570-573; DDX 575; DDX 603; POX 462; POX 464-483; POX 767769; POX 771-774; POX 875-877; POX 882-888 and POX 893.
Trial Testimony of Laurent Havard dated Sep. 21, 2007 with DTX 384; DTX 520; DTX 561-62; DTX 570; DTX 573; DTX 575; DTX 593; DTX 750-52; DTX 3011; DTX 3017-18; DTX 3050; PTX 575; PTX 2064; PTX 2074; PTX 2077; PTX 2079.
Deposition testimony of Jean Cedric Joliant dated Apr. 26, 2007 and Jun. 13, 2007 with DDX 384; DDX 517; DDX 520; DDX 551-568; DDX 575-577; PDX 465-483.
Trial testimony of Jean Cedric Jollant dated Sep. 20, 2007 with DTX 157; DTX 473; DTX 719; DTX551-64; DTX598; DTX722; DTX 1903; DTX3009-10; DTX3014; DTX3016-18; DTX 3020; DTX 3023; DTX 3025; PTX 166; PTX 520; PTX 526; PTX 539; PTX 573; PTX 575; PTX 579; PTX 2065.
Deposition testimony of Marc Lorin dated Sep. 5, 2007 with DDX 385; DDX 721-722; DDX 730.
Deposition testimony of Christopher Malo dated May 23, 2007 with DDX 524.

(56) References Cited

OTHER PUBLICATIONS

Deposition testimony of Fred Mastro dated May 21, 2007 with DDX 638; POX 538; POX 540-543.
Trial testimony of Fred Mastro dated Sep. 25, 2007 with DTX 592.
Deposition testimony of William McHorris dated Apr. 10, 2007 with POX 416-417.
Deposition testimony of Josephine Sheng dated Jun. 26, 2007 with DDX 520; DDX 522; DDX 536; DDX 575; POX 493; POX 683-683a; POX 775.
Deposition testimony of Bruno Spada dated Apr. 30, 2007 and May 2, 2007 with DDX 384-385; DDX 519-21; DDX 537-38; DDX 579-580; DDX 522; DDX 538; PDX 493-495; PDX 519-522.
Trial testimony of Bruno Spada dated Sep. 24, 2007 with DTX 306; DTX 384; DTX 518-522; DTX 524; DTX 575; DTX 579-580; DTX 593; DTX 626; DTX 628; DTX 646; DTX 1899 DTX 2086; DTX 3020-3021; DTX 3058-3059; DTX 3061; DTX 3085; PTX 737; PTX 840; PTX 2083; PTX 2087; PTX 2099; PTX 2101.
User Interface Design for display options design, DX 426, CM 000249-CM 000287, DTX 426, Jul. 8, 1998.
Letter from EPO to TT Re: Five Recently Filed European Patent Oppositions, Feb. 21, 2006.
Notice of Opposition to a European Patent EP 1319211 B 1, AN ITRA Medienprojekte GmbH, Jan. 13, 2006.
Notice of Opposition to a European Patent by Deutsche Borse AG Jan. 12, 2006.
Notice of Opposition to a European Patent by EccoWare Ltd., Jan. 13, 2006.
Notice of Opposition to a European Patent by Rosenthal Collins Group LLC, Jan. 12, 2006.
Notice of Opposition to a European Patent by Tick-It GmbH, Jan. 13, 2006.
Declaration of Walter Buist, Exhibit 17, Apr. 26, 2007; with Faxed Signature Page.
Letter from J. Walaski to the EPO Re: Change of Address, Dec. 19, 2006.
A. Klein, WallStreet.com—Fat Cat Investing at the Click of a Mouse, Chapt. 14 "Finding Gold in Tribeca", 1998; Exhibit 16.
A. Klein, WaliStreet.com—Fat Cat Investing at the Click of a Mouse, Chapt. 14-16, 18, 23, 1998; Exhibit 16 (Cont'd).
WIT Digital Stock Market, User Interface Rev. 9, Exhibit 15 (circa 1999).
Opposition Trading Technologies, Inc. Application No. 01920183.9 EP 1319211 B1, Exhibit 4 (Japanese and English Versions), Sep. 1997.
System for Buying and Selling Futures and Options Transaction Terminal Operational Guidelines, TSE Business Systems Dept., TSE647-995, eS062297-eS062380, D1(2) (Aug. 1998).
Letter from EPO to TT Re: Further European Patent Opposition, Feb. 23, 2006.
Letter from EPO to TT Enclosing European Patent Oppositions, Jan. 25, 2006.
Opposition TT, EP 1 319211 B1, Copy set 1, Annex One—Grounds of Opposition, Jan. 19, 2006.
Deposition Transcript of Atsushi Kawashima, Nov. 21, 2005, Opposition EP 1 319 211 B1 Exhibit 3.
The Application Program Interface (API) Reference Manual for LIFFE Connect, Sep. 1998, release 3.1, EP 1 319211 B1 Exhibit 7A, e80060146-e80060237.
Deposition Transcript of Paul MacGregor, Nov. 1, 2005, Opposition EP 1 319 211 B1 Exhibit 9A.
"Expanding futures and options trading around the world, around the clock," GLOBEX, 1989, 48 pages.
S. Hansell, "The computer that ate Chicago," Institutional Investor, Feb. 1989, 5 pages.
"Sydney Futures Exchange Announces Plans to Join GLOBEX," GLOBEX Report: An Update on the CME global electronic exchange, vol. II, No. 2, Feb. 10, 1989, 4 pages.
New York Mercantile Exchange (NYMEX) Access Documents, Feb. 28, 1992, 413 pages.
The Computer Assisted Trading System (CATS) Traders' Manual, Toronto Stock Exchange, Sep. 30, 1977, 142 pages.
Market Watch trading screen, date not available, 1 page.
Grummer et al., "Preliminary Feasibility Study," Bermudex Ltd., Nov. 1980, 100 pages.
Peake et al., Appendix C of Preliminary Feasibility Study, "The ABCs of trading on a national market system," Bermudex Ltd., Sep. 1997, 16 pages.
Peake, J.W., Appendix E of Preliminary Feasibility Study, "The last fifteen meters," Bermudex Ltd., Jun. 15, 1997, 18 pages.
Declaration of Brendan Bradley in Case No. 04 C 5312, Nov. 18, 2004, 27 pages.
Memorandum Opinion and Order of Judge James B. Moran in Case No. 04 C 5312, Feb. 9, 2005, 22 pages.
Australian Patent Office Search and Examination Report for Singapore Patent Application No. 200405020-9 dated Aug. 2, 2007, mailed Aug. 7, 2007.
European Search Report for EP Application No. 04105905.6 dated Mar. 24, 2005, mailed Apr. 1, 2005.
Great Britain Search Report on GB Application No. 02193068.8 dated Nov. 27, 2002.
International Preliminary Examination Report on PCT Application No. PCT/US01/06792 dated Apr. 9, 2002, mailed Apr. 12, 2002.

|  |  |  |  |  |  |  |  |
|---|---|---|---|---|---|---|---|
| CME: CD 3 | | | | | | | |

| 1 | 5 | 10 | △ | △ | 0 X 0  CD MAR00 GTD Limit <None> | | |
|---|---|---|---|---|---|---|---|
| 100 | 500 | 0 | 0 | | GTD | Limit | <None> ▼ | Open ▼ | A1 ▼ | Cross With | Cross |
| Clear | | ▽ | ▽ | <Default> ▼ | | KXH | |
| Buy | | Sell | | | ☐ Lock | Clear | |

702 { | Qty | 10 | Click Offset | 2 | Click +/- | 5 | Dime +/- | 2 | ⊙ Click ○ Dime | 0 |

701 {

| Contract | Depth | BidQty | BidPrc | AskPrc | AskQty | LastPrc | LastQty | Total |
|---|---|---|---|---|---|---|---|---|
| CDH0 | ○ | 785 | 7626 | 7627 | 21 | 7627 | 489 | 8230 |
| | | 626 | 7625 | 7629 | 815 | | | |
| | | 500 | 7624 | 7630 | 600 | | | |
| | | 500 | 7623 | 7631 | 2456 | | | |
| | | 200 | 7622 | 7632 | 800 | | | |

| SYCOM: APPLE 1 | | | | | | | | | | | | |
|---|---|---|---|---|---|---|---|---|---|---|---|---|
| 1 | 5 | 10 | △ | △ | 0 X 39.55 APPLE JUL99 GTD Limit <None> | | | | | | | |
| 100 | 500 | 0 | | 39.55 | GTD | Limit | <None> | Open | M1 | Cross With | Cross | |
| Clear | | | ▽ | ▽ | ALASTAIR | | | | | DOCA | | |
| Buy | | | Sell | | | | □ Lock | Clear | | | | |

901 {
| Month | BidQty | BidPrc | AskPr | AskQt | WrkS | LastP | LastQ | Total | TheoPrc | TheoBid | TheoAsk | Expiry |
|---|---|---|---|---|---|---|---|---|---|---|---|---|
| JUL99 | 760 | 39.55 | 40.10 | 3120 | | 40.10 | 60 | 3000 | 39.85 | 39.6 | 39.75 | JUL99 |

Microsoft Excel - Book 1

902 {
| | A | B | C | D | E |
|---|---|---|---|---|---|
| 1 | BidPrc | AskPrc | TheoPrc | TheoBid | TheoAsk |
| 2 | 39.55 | 40.1 | 39.85 | 39.6 | 39.75 |

CLICK BASED TRADING WITH MARKET DEPTH DISPLAY

PRIORITY

The present application is a Continuing Application of U.S. Ser. No. 11/061,554, filed Feb. 18, 2005, now U.S. Pat. No. 7,505,932, which is in turn a Continuation Application of U.S. Ser. No. 09/589,751, filed Jun. 9, 2000, now U.S. Pat. No. 6,938,011, which claims priority to U.S. Provisional Patent Application Ser. No. 60/186,322, entitled "Market Depth Display Click Based Trading and Mercury Display" filed Mar. 2, 2000, the contents of which are incorporated herein by reference.

FIELD OF INVENTION

The present invention is directed to the electronic trading of commodities. Specifically, the invention provides a trader with a versatile and efficient tool for executing trades. It facilitates the display of and the rapid placement of trade orders within the market trading depth of a commodity, where a commodity includes anything that can be traded with quantities and/or prices.

BACKGROUND OF THE INVENTION

At least 60 exchanges throughout the world utilize electronic trading in varying degrees to trade stocks, bonds, futures, options and other products. These electronic exchanges are based on three components: mainframe computers (host), communications servers, and the exchange participants' computers (client). The host forms the electronic heart of the fully computerized electronic trading system. The system's operations cover order-matching, maintaining order books and positions, price information, and managing and updating the database for the online trading day as well as nightly batch runs. The host is also equipped with external interfaces that maintain uninterrupted online contact to quote vendors and other price information systems.

Traders can link to the host through three types of structures: high speed data lines, high speed communications servers and the Internet. High speed data lines establish direct connections between the client and the host. Another connection can be established by configuring high speed networks or communications servers at strategic access points worldwide in locations where traders physically are located. Data is transmitted in both directions between traders and exchanges via dedicated high speed communication lines. Most exchange participants install two lines between the exchange and the client site or between the communication server and the client site as a safety measure against potential failures. An exchange's internal computer system is also often installed with backups as a redundant measure to secure system availability. The third connection utilizes the Internet. Here, the exchange and the traders communicate back and forth through high speed data lines, which are connected to the Internet. This allows traders to be located anywhere they can establish a connection to the Internet.

Irrespective of the way in which a connection is established, the exchange participants' computers allow traders to participate in the market. They use software that creates specialized interactive trading screens on the traders' desktops. The trading screens enable traders to enter and execute orders, obtain market quotes, and monitor positions. The range and quality of features available to traders on their screens varies according to the specific software application being run. The installation of open interfaces in the development of an exchange's electronic strategy means users can choose, depending on their trading style and internal requirements, the means by which they will access the exchange.

The world's stock, bond, futures and options exchanges have volatile products with prices that move rapidly. To profit in these markets, traders must be able to react quickly. A skilled trader with the quickest software, the fastest communications, and the most sophisticated analytics can significantly improve his own or his firm's bottom line. The slightest speed advantage can generate significant returns in a fast moving market. In today's securities markets, a trader lacking a technologically advanced interface is at a severe competitive disadvantage.

Irrespective of what interface a trader uses to enter orders in the market, each market supplies and requires the same information to and from every trader. The bids and asks in the market make up the market data and everyone logged on to trade can receive this information if the exchange provides it. Similarly, every exchange requires that certain information be included in each order. For example, traders must supply information like the name of the commodity, quantity, restrictions, price and multiple other variables. Without all of this information, the market will not accept the order. This input and output of information is the same for every trader.

With these variables being constant, a competitive speed advantage must come from other aspects of the trading cycle. When analyzing the time it takes to place a trade order for a given commodity, various steps contribute in different amounts to the total time required. Approximately 8% of the total time it takes to enter an order elapses between the moment the host generates the price for the commodity and the moment the client receives the price. The time it takes for the client application to display the price to the trader amounts to approximately 4%. The time it takes for a trade order to be transmitted to the host amounts to approximately 8%. The remainder of the total time it takes to place an order, approximately 80%, is attributable to the time required for the trader to read the prices displayed and to enter a trade order. The present invention provides a significant advantage during the slowest portion of the trading cycle—while the trader manually enters his order. Traders recognize that the value of time savings in this portion may amount to millions of dollars annually.

In existing systems, multiple elements of an order must be entered prior to an order being sent to market, which is time consuming for the trader. Such elements include the commodity symbol, the desired price, the quantity and whether a buy or a sell order is desired. The more time a trader takes entering an order, the more likely the price on which he wanted to bid or offer will change or not be available in the market. The market is fluid as many traders are sending orders to the market simultaneously. It fact, successful markets strive to have such a high volume of trading that any trader who wishes to enter an order will find a match and have the order filled quickly, if not immediately. In such liquid markets, the prices of the commodities fluctuate rapidly. On a trading screen, this results in rapid changes in the price and quantity fields within the market grid. If a trader intends to enter an order at a particular price, but misses the price because the market prices moved before he could enter the order, he may lose hundreds, thousands, even millions of dollars. The faster a trader can trade, the less likely it will be that he will miss his price and the more likely he will make money.

SUMMARY OF THE INVENTION

The inventors have developed the present invention which overcomes the drawbacks of the existing trading systems and dramatically reduces the time it takes for a trader to place a trade when electronically trading on an exchange. This, in turn, increases the likelihood that the trader will have orders filled at desirable prices and quantities.

Click based trading, as described herein and specifically the "Click" and "Dime" methods of the present invention, enables a trader to execute single mouse click trades for large volumes of commodities at a price within a pre-specified range.

Specifically, the present invention is directed to a method and system for placing a trade order for a commodity on an electronic exchange using a client system with a user input device and with preset parameters for trade orders. The invention includes displaying a market depth of the commodity through a dynamic display of prices and quantities of a plurality of bids and asks in the market for the commodity. The invention also includes initiating placement of a trade order of the commodity in response to a single action of the user input device with a pointer of the user input device positioned over an area in the dynamic display. The contents of the trade order are based in part upon the preset parameters and the position of the pointer at the time of the single action by the user.

These embodiments, and others described in greater detail herein, provide the trader with improved efficiency and versatility in placing, and thus executing, trade orders for commodities in an electronic exchange. Other features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

DETAILED DESCRIPTION OF THE PREFERRED EMBODIMENTS

As described with reference to the accompanying figures, the present invention provides a method and system for display of a traded commodity's market depth and for facilitating rapid placement of trade orders within the market depth. A commodity's market depth is the current bid and ask prices and quantities in the market. The invention increases the likelihood that the trader will be able to execute orders at desirable prices and quantities.

In the preferred embodiment, the present invention is implemented on a computer or electronic terminal. The computer is able to communicate either directly or indirectly (using intermediate devices) with the exchange to receive and transmit market, commodity, and trading order information. It is able to interact with the trader and to generate contents and characteristics of a trade order to be sent to the exchange. It is envisioned that the system of the present invention can be implemented on any existing or future terminal or device with the processing capability to perform the functions described herein. The scope of the present invention is not limited by the type of terminal or device used. Further, the specification refers to a single click of a mouse as a means for user input and interaction with the terminal display as an example of a single action of the user. While this describes a preferred mode of interaction, the scope of the present invention is not limited to the use of a mouse as the input device or to the click of a mouse button as the user's single action. Rather, any action by a user within a short period of time, whether comprising one or more clicks of a mouse button or other input device, is considered a single action of the user for the purposes of the present invention.

Figure 1:
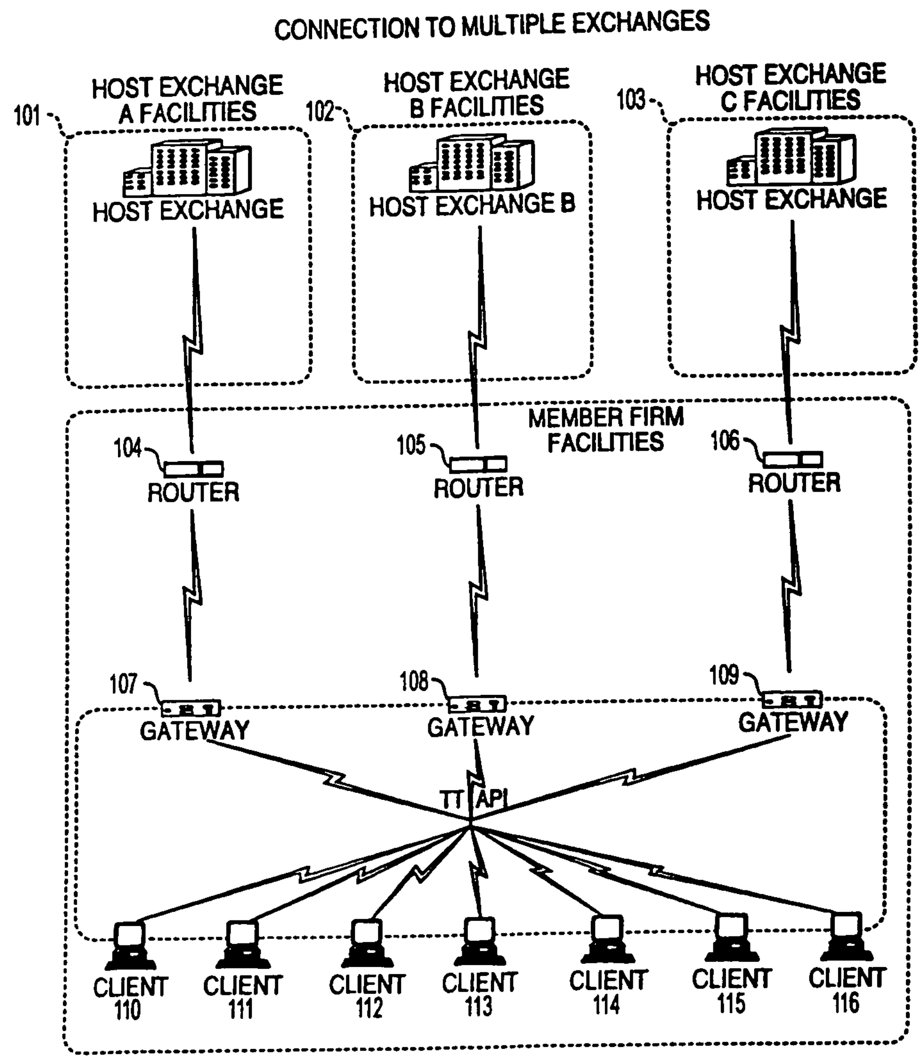
FIG. 1 illustrates the network connections between multiple exchanges and client sites.

The system can be configured to allow for trading in a single or in multiple exchanges simultaneously. Connection of the system of the present invention with multiple exchanges is illustrated in FIG. 1. This figure shows multiple host exchanges 101-103 connected through routers 104-106 to gateways 107-109. Multiple client terminals 110-116 for use as trading stations can then trade in the multiple exchanges through their connection to the gateways 107-109. When the system is configured to receive data from multiple exchanges, then the preferred implementation is to translate the data from various exchanges into a simple format. This "translation" function is described below with reference to FIG. 1. An applications program interface ("TT API" as depicted in the figure) translates the incoming data formats from the different exchanges to a simple preferred data format. This translation function may be disposed anywhere in the network, for example, at the gateway server, at the individual workstations or at both. In addition, the storage at gateway servers and at the client workstations, and/or other external storage cache historical data such as order books which list the client's active orders in the market; that is, those orders that have neither been filled nor cancelled. Information from different exchanges can be displayed at one or in multiple windows at the client workstation. Accordingly, while reference is made through the remainder of the specification to a single exchange to which a trading terminal is connected, the scope of the invention includes the ability to trade, in accordance with the trading methods described herein, in multiple exchanges using a single trading terminal.

The preferred embodiments of the present invention include the display of "Market Depth" and allow traders to view the market depth of a commodity and to execute trades within the market depth with a single click of a computer mouse button. Market Depth represents the order book with the current bid and ask prices and quantities in the market. In other words, Market Depth is each bid and ask that was entered into the market, subject to the limits noted below, in addition to the inside market. For a commodity being traded, the "inside market" is the highest bid price and the lowest ask price.

The exchange sends the price, order and fill information to each trader on the exchange. The present invention processes this information and maps it through simple algorithms and mapping tables to positions in a theoretical grid program or any other comparable mapping technique for mapping data to a screen. The physical mapping of such information to a screen grid can be done by any technique known to those skilled in the art. The present invention is not limited by the method used to map the data to the screen display.

How far into the market depth the present invention can display depends on how much of the market depth the exchange provides. Some exchanges supply an infinite market depth, while others provide no market depth or only a few orders away from the inside market. The user of the present invention can also chose how far into the market depth to display on his screen.

Figure 2:
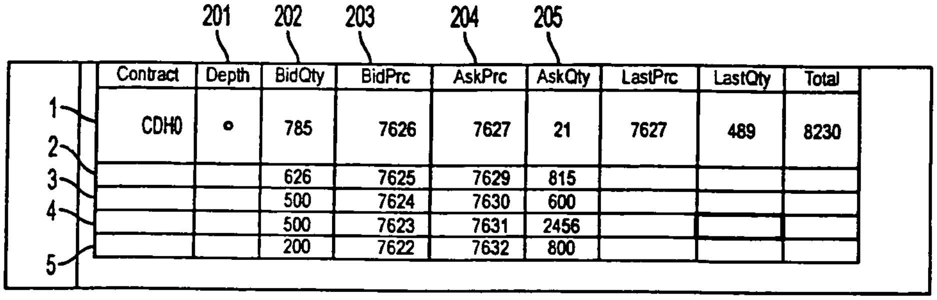
FIG. 2 illustrates screen display showing the inside market and the market depth of a given commodity being traded.

FIG. 2 illustrates a screen display of the present invention showing the inside market and the market depth of a given commodity being traded. Row 1 represents the "inside market" for the commodity being traded which is the best (highest) bid price and quantity and the best (lowest) ask price and quantity. Rows 2-5 represent the "market depth" for the commodity being traded. In the preferred embodiment of the present invention, the display of market depth (rows 2-5) lists the available next-best bids, in column 203, and asks, in column 204. The working bid and ask quantity for each price level is also displayed in columns 202 and 205 respectively (inside market—row 1). Prices and quantities for the inside market and market depth update dynamically on a real time basis as such information is relayed from the market.

In the screen display shown in FIG. 2, the commodity (contract) being traded is represented in row 1 by the character string "CDH0". The Depth column 208 will inform the trader of a status by displaying different colors. Yellow indicates that the program application is waiting for data. Red indicates that the Market Depth has failed to receive the data from the server and has "timed out." Green indicates that the data has just been updated. The other column headings in this and all of the other figures, are defined as follows. BidQty (Bid Quantity): the quantity for each working bid, BidPrc (Bid Price): the price for each working bid, AskPrc (Ask Price): the price for each working ask, AskQty (Ask Quantity): the quantity for each working ask, LastPrc (Last Price): the price for the last bid and ask that were matched in the market and LastQty (Last Quantity): the quantity traded at the last price. Total represents the total quantity traded of the given commodity.

The configuration of the screen display itself informs the user in a more convenient and efficient manner than existing systems. Traders gain a significant advantage by seeing the market depth because they can see trends in the orders in the market. The market depth display shows the trader the interest the market has in a given commodity at different price levels. If a large amount of bids or asks are in the market near the trader's position, he may feel he should sell or buy before the inside market reaches the morass of orders. A lack of orders above or below the inside market might prompt a trader to enter orders near the inside market. Without seeing the market depth, no such strategies could be utilized. Having the dynamic market depth, including the bid and ask quantities and prices of a traded commodity aligned with and displayed below the current inside market of the commodity conveys the information to the user in a more intuitive and easily understandable manner. Trends in the trading of the commodity and other relevant characteristics are more easily identifiable by the user through the use of the present invention.

Various abbreviations are used in the screen displays, and specifically, in the column headings of the screen displays reproduced herein. Some abbreviations have been discussed above. A list of common abbreviations and their meanings is provided in Table 1.

TABLE I

Abbreviations

| COLUMN | DESCRIPTION |
|---|---|
| Month | Expiration Month/Year |
| Bid Mbr$_{(1)}$ | Bid Member ID |
| WrkBuys$_{(2)}$ | Working Buys for entire Group ID |
| BidQty | Bid Quantity |
| ThrshBid$_{(6)}$ | Threshold Bid Price |
| BidPrc | Bid Price |
| Bid Qty Accum | Accumulated Bid Quantity |
| BidPrc Avg | Bid Price Average |
| AskPrc Avg | Ask Price Average |
| AskQty Accum | Accumulated Ask Quantity |
| AskPrc | Ask Price |
| ThrshAsk$_{(6)}$ | Threshold Ask Price |
| AskQty | Ask Quantity |
| WrkSells$_{(2)}$ | Working Sells for entire Group ID |
| Ask Mbr$_{(1)}$ | Ask Member ID |
| NetPos | Net Position |
| FFNetPos | Fast Fill Net Position |
| LastPrc | Last Price |
| LastQty | Last Quantity |
| Total | Total Traded Quantity |
| High | High Price |
| Low | Low Price |
| Open | Opening Price |
| Close | Closing Price |
| Chng | Last Price − Last Close |
| TheoPrc | Theoretical Price |
| TheoBid | Theoretical Bid Price |
| TheoAsk | Theoretical Ask Price |
| QAct | Quote Action (Sends individual quotes) |
| BQQ | Test Bid Quote Quantity |
| BQP | Test Bid Quote Price |
| Mkt BQQ | Market Bid Quote Quantity |
| Mkt BQP | Market Bid Quote Price |
| Quote | Checkbox activates/deactivates contract for quoting |
| Mkt AQQ | Market Ask Quote Quantity |
| Mkt AQP | Market Ask Quote Price |
| AQP | Ask Quote Price |
| AQQ | Ask Quote Quantity |
| Imp BidQty$_{(5)}$ | Implied Bid Quantity |
| Imp BidPrc$_{(5)}$ | Implied Bid Price |
| Imp AskQty$_{(5)}$ | Implied Ask Quantity |
| Imp AskPrc$_{(5)}$ | Implied Ask Price |
| Gamma$_{(3)}$ | Change in Delta given 1 pt change in underlying |
| Delta$_{(3)}$ | Change in price given 1 pt change in underlying |
| Vola$_{(3)}$ | Percent volatility |
| Vega$_{(3)}$ | Price change given 1% change in Vola |
| Rho$_{(3)}$ | Price change given 1% change in interest rate |
| Theta$_{(3)}$ | Price change for every day that elapses |
| Click Trd | Activate/deactivate click trading by contract |
| S (Status) | Auction, Closed, FastMkt, Not Tradable, Pre-trading, Tradable, S = post-trading |
| Expiry | Expiration Month/Year |

Click based trading enables a trader to execute trades with a single mouse click within the market depth. The trader inputs a quantity and price range once and then sends orders to market with one click on a price field in the Market Depth grid. In the preferred embodiment of the present invention, a trader using click based trading would be presented with a screen display similar that that shown in FIG. 3. This figure shows an entire trading window screen display, including the display of market depth as described with respect to FIG. 2. The portion of the display shown in FIG. 3 identified as area 301 shows various trading information and options which are not pertinent in the description of the present invention. Area 303 is the display of the inside market and the market depth as described above. Area 302 provides the trader with the necessary options to perform click based trading under the present invention.

Under the present invention, there are at least two modes of click based trading; that is, there are at least two types of trade orders that can be placed using click based trading. These are "Click" trades and "Dime" trades. Both allow the trader to trade large quantities of a commodity within the market depth or the inside market with a single mouse click. Generally, "Click" trades are used to quickly execute trade orders within a preset range with respect to the last traded price or within a preset range from the actual bid or ask price clicked by the user. "Dime" trades are used to quickly join the existing market at a chosen level. Each of these types of trades is discussed in detail herein along with corresponding examples.

Figure 3:
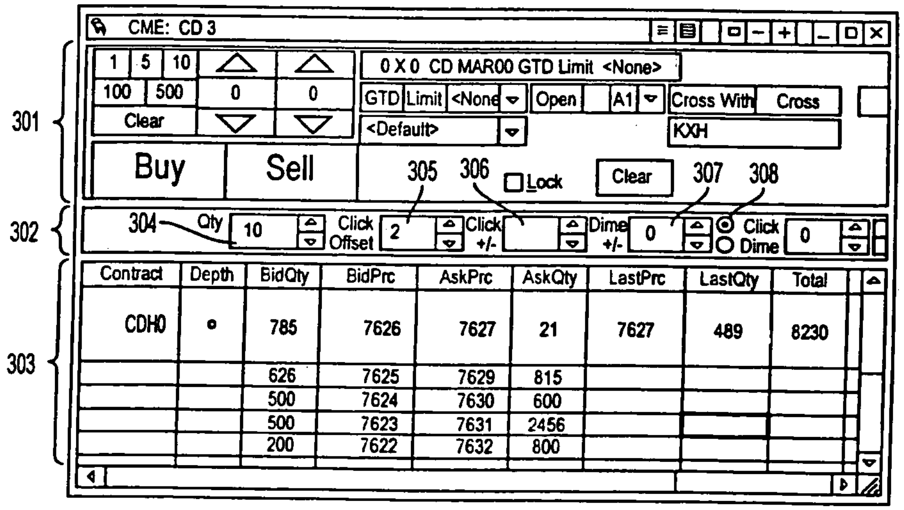
FIG. 3 illustrates an entire trading window screen display including the display of market depth.

Area 302 in FIG. 3 shows the various parameters that can be adjusted by the user when performing click based trading under the present invention. The amount shown in the "QTY" 304 box represents the amount of the commodity to be traded. The "Click Offset" amount 305 and the "Click +/−" amount 306 are used in performing click trades. The "Dime +/−" 307 amount is used in performing dime trades. The round buttons 308 next to the words "Click" and "Dime" are used to enable either click or dime trading. By setting these parameters, the user is enabled to place trades based on multiple variables with just a single click in the market depth of the commodity. Note that the elements in area 302 have been arranged in a preferred configuration. However, the invention encompasses moving the area 302 to a different location, or displaying the elements in area 302 vertically or at an angle, or separating the different elements to create a plurality of different areas 302.

Figure 4:
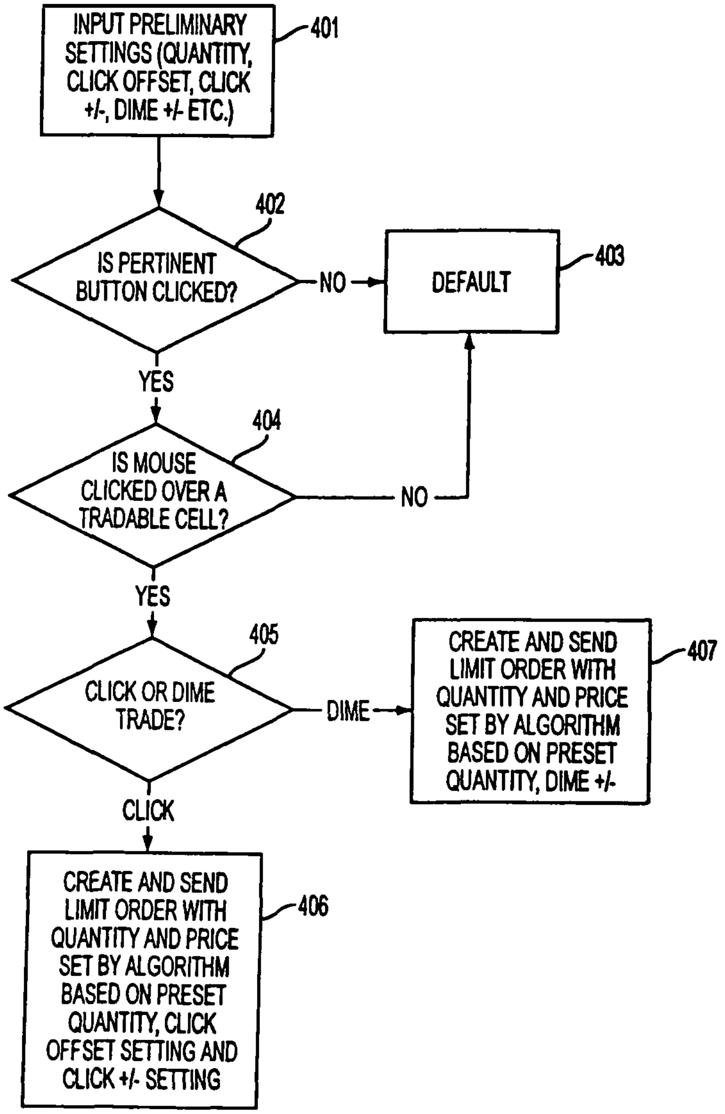
FIG. 4 is a flowchart illustrating the process of Click and Dime trading.

The basic operation of the system in performing click based trading and reacting to user inputs on a screen such as that shown in FIG. 3 is shown via the flowchart of FIG. 4. In step 401 of the process, the preliminary settings are input as discussed above with respect to the screen display in FIG. 3 and area 302. In step 402, the system determines whether a pertinent button has been clicked on a mouse or some other form of input device indicating that the user is initiating the placement of a trade order. If the system determines that a pertinent button was clicked, the system then determines, in step 404, whether the mouse pointer was positioned over a tradeable cell on the screen display when the button was clicked. Tradeable cells include those in area 303 under the four bid and ask columns 202-205. If a pertinent button was not clicked or if the mouse pointer was not positioned over a tradeable cell, the system does not attempt to place a click based trade order and, in step 403 returns to a default condition, such as displaying market information and awaiting initiation of a trade order. If, however, a pertinent button was clicked over a tradeable cell, in step 405 the system checks to determine whether a click trade is requested or a dime trade is requested. In the preferred embodiment of the present invention, this determination is made based on which button ("Click" or "Dime") has been selected on the screen display in area 302. As will be seen in the description of other embodiments of the invention, this determination can also be made based upon which mouse button has been depressed. If it is determined that a click trade is requested, the system, in step 406, creates and sends a limit order to the exchange with the quantity and price set in accordance with an algorithm (discussed herein) based on the preliminary settings and the market prices. Similarly, if it is determined that a dime trade is requested, the system, in step 407, creates and sends a limit order to the exchange with the quantity and price set in accordance with a separate algorithm.

Next, placement of click trades under the present invention, as opposed to dime trades, is described with reference to the screen displays of FIGS. 3 and 5. Using the various parameters, traders can use the present invention to implement various trading strategies. Described herein are two such strategies based on two embodiments of the present invention and its provisions for placing click trades. The first involves the use of the "Click +/−" feature of the invention. Trading with Click +/− allows a trader to chase a fast moving market up to a certain amount of ticks. A trader would set the number of ticks in the Click +/− field once. He would then be able to send orders to market with a single click in the market depth for a price up to (or down to if selling) the price clicked plus (or minus if selling) the number of ticks in the Click +/− field. A "tick" is the minimum change in a price value that is set by the exchange for each commodity (for example, $0.01, $0.05, $0.10 or any other value). The best available order in the market within the preset parameters would be filled.

If the market was moving quickly and the inside market was rapidly increasing or decreasing (or both alternatively), use of Click +/− will insure that the trader can keep up with the changes. Using the traditional electronic trading method, he might not be able to sell or buy large quantities at or near the price he needs because the price moved before he could enter all of the required data. Using Click +/−, he can trade prespecified quantities at any chosen price plus or minus the number of ticks chosen. This makes it more likely that his trades will get filled in a rapidly changing market before the market moves away.

The following equations are used to exemplify how the system would determine at what price an order should be placed. The following abbreviations are used in the formulas: Ask Price clicked with Click trading button=A, Bid Price clicked with Click trading button=B, Click +/− value=C, Quantity=Q, Buy limit order sent to the market=Bo and Sell limit order sent to the market=So.

$$\text{If } C>0 \text{ then } Bo=(A+C)Q \qquad \text{(Eq. 1)}$$

$$\text{If } C>0 \text{ then } So=(B-C)Q \qquad \text{(Eq. 2)}$$

If the user has set the Click +/− value to 0, the Click +/− feature is essentially disabled and the Click Offset feature is enabled (discussed herein).

Figure 5:
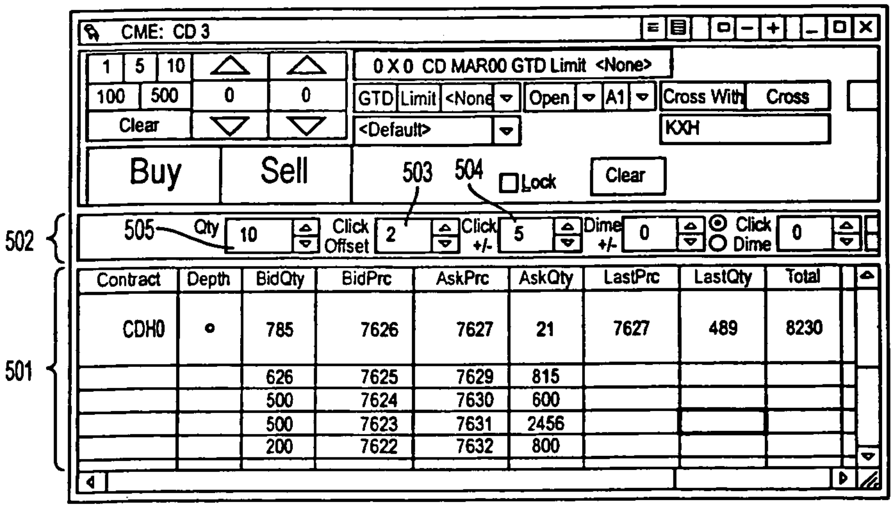
FIG. 5 illustrates an entire trading window screen display including the display of market depth in which the Click +/− feature is enabled.

Referring now to the screen display shown in FIG. 5, the "Click Offset" 502 feature is disabled since a "Click +/−" 504 amount greater than 0 is entered. In the case shown, the Click +/− amount is set to "5". This entry will enable the trader to trade at any price he clicks in the market grid area 501 and enter an order for up to (or down to if selling) 5 ticks above (or below) the clicked price. Using the values shown in the screen display of FIG. 5, the placement of click trades using the Click +/− feature is now described using examples. In these examples, and as shown in FIG. 5, the QTY 505 is 10 and the Click +/− 504 value is 5.

Suppose the trader seeks to sell 10 lots of the commodity. He clicks on the 7623 Bid Price, which is three rows below the inside market. This will send a limit order to the exchange to sell 10 lots for as low as 7618 (7623 minus 5 ticks). The best available price will be filled first. Thus, in this scenario, all 10 lots will be filled because bids exist in the marketplace in this price range and the quantities amount to many more than 10 lots. Because the best BidPrc will be used, the 10 lots will be sold at 7626, if it is still available when the order is made.

Suppose the trader seeks to buy 10 lots of the commodity. He clicks on the 7630 Ask Price, which is two rows above the inside market. This will send a limit order to the exchange to buy 10 lots at the best prices available for as much as 7635 (7630 plus 5 ticks). This order will also be filled because offers exist in the marketplace in this price range and the quantities amount to many more than 10 lots.

There is also a safety mechanism in the present invention that can be used when placing click trades. This feature is known as "Click Offset" and it prevents an order from being placed at a price that is too far from the last traded price of the commodity. Effectively, the trader establishes a floor or ceiling above or below the last traded price by enabling Click Offset. To use the Offset feature, a trader would set the Click +/− value to zero. He would then set a figure in the Click Offset field. This will halt any orders that are above or below the last traded price by at least the number of ticks in the Click Offset field. As mentioned above, a "tick" is the minimum change in a price value that is set by the exchange for each commodity (for example, $0.01, $0.05, $0.10 or any other value). Using Click Offset a trader could trade in the market depth, but no order would be sent to market that is entered by the trader for a price further from the last price than the figure displayed in the Click Offset field.

Without the Click Offset feature, a trader might intend to click on a particular price but, between the time he decides to do so and the time he actually clicks (which may be only hundredths of a second), the price may change. He may not be able to stop the downward motion of his finger and the order would be sent to market at an incorrect or undesired price. Sometimes the change in price is significant and could cost the trader a lot of money. Alternatively, the mouse pointer may inadvertently be improperly positioned when the trader clicks which, without the Click Offset feature, would also send an order at an incorrect or undesirable price.

The following equations are used to exemplify how the system would determine whether an order should be placed when the Click Offset feature is used. The following abbreviations are used in these formulas: Ask Price clicked with Click trading button=A, Bid Price clicked with Click trading button=B, Last Traded Price=L, Click Offset value=CO, Click +/− value=C, Quantity=Q, Buy limit order sent to the market=Bo and Sell limit order sent to the market=So.

$$\text{If } C=0 \text{ and if absolute value of } (L-A)>CO \text{ then NO ORDER SENT} \quad \text{(Eq. 3)}$$

$$\text{If } C=0 \text{ and if absolute value of } (L-B)>CO \text{ then NO ORDER SENT} \quad \text{(Eq. 4)}$$

$$\text{If } C=0 \text{ and if absolute value of } (L-A)\leq\text{Off then } Bo=(A)Q \quad \text{(Eq. 5)}$$

$$\text{If } C=0 \text{ and if absolute value of } (L-B)\leq\text{Off then } So=(B)Q \quad \text{(Eq. 6)}$$

Referring now to the screen display shown in FIG. 3, the "Click Offset" feature is enabled since the "Click +/−" amount is set to 0 (blank). In the case shown, the Click Offset amount is set to "2". This entry will enable the trader to trade at any price he clicks in the market grid area 301 so long as it is within two ticks from the last price (LastPrc) 7627. Using the values shown in the screen display of FIG. 3, the placement of click trades using the Click Offset feature is now described using examples. In these examples, and as shown in FIG. 3, the QTY is 10, the Click Offset value is 2 and the last price at which the commodity was traded is 7627.

Suppose the trader wishes to buy 10 lots. The last traded price is 7627 so the trader might right click on 7629, which is one row below the inside market ask price. This would send a buy limit order to the market for his previously entered quantity (10 in the screen display of FIG. 3) for a price of 7629. Because this is within two ticks of the last traded ask price, the order would go to the market. All 10 lots would be filled because there are 836 (815 plus 21) lots in the market at least at this price. If, however, the trader clicked on 7630 or higher, the system would not allow a trade order to be generated because the price is greater than two ticks above the last traded price.

Both of the Click +/− and the Click Offset features of placing click trades in the present invention as described above are shown in the flowchart of FIG. 6. First, in step 601, the system determines whether a click trade has been requested. This step connects with step 406 of FIG. 4. In one embodiment, as discussed above and as shown in box 601, determination that a click trade is requested can be based, in part, on which mouse button was depressed. In step 602, the system determines whether a buy or a sell order is requested based upon whether a price has been clicked in the Ask column or in the Bid column. A click in the Bid column indicates that the trader is initiating a sell order wherein the system then moves to step 603. A click in the Ask column indicates that the trader is initiating a buy order wherein the system then moves to step 604.

The system, in each of steps 603 and 604 determines whether the Click +/− feature is being used by checking whether the Click +/− value is set to 0 or whether it is set to a number greater than 0. If, in 603 it is determined that the Click +/− value is set to greater than 0, the system then creates, in step 605, a sell limit order for the preset quantity and a price equal to the Bid price clicked minus the Click +/− value (see Eq. 2). The sell limit order is sent to the market. Similarly, if in step 604 it is determined that the Click +/− value is set to greater than 0, the system then creates, in step 606, a buy limit order for the preset quantity and for a price equal to the Ask price clicked plus the Click +/− setting (see Eq. 1). The buy limit order is sent to the market.

Figure 6:
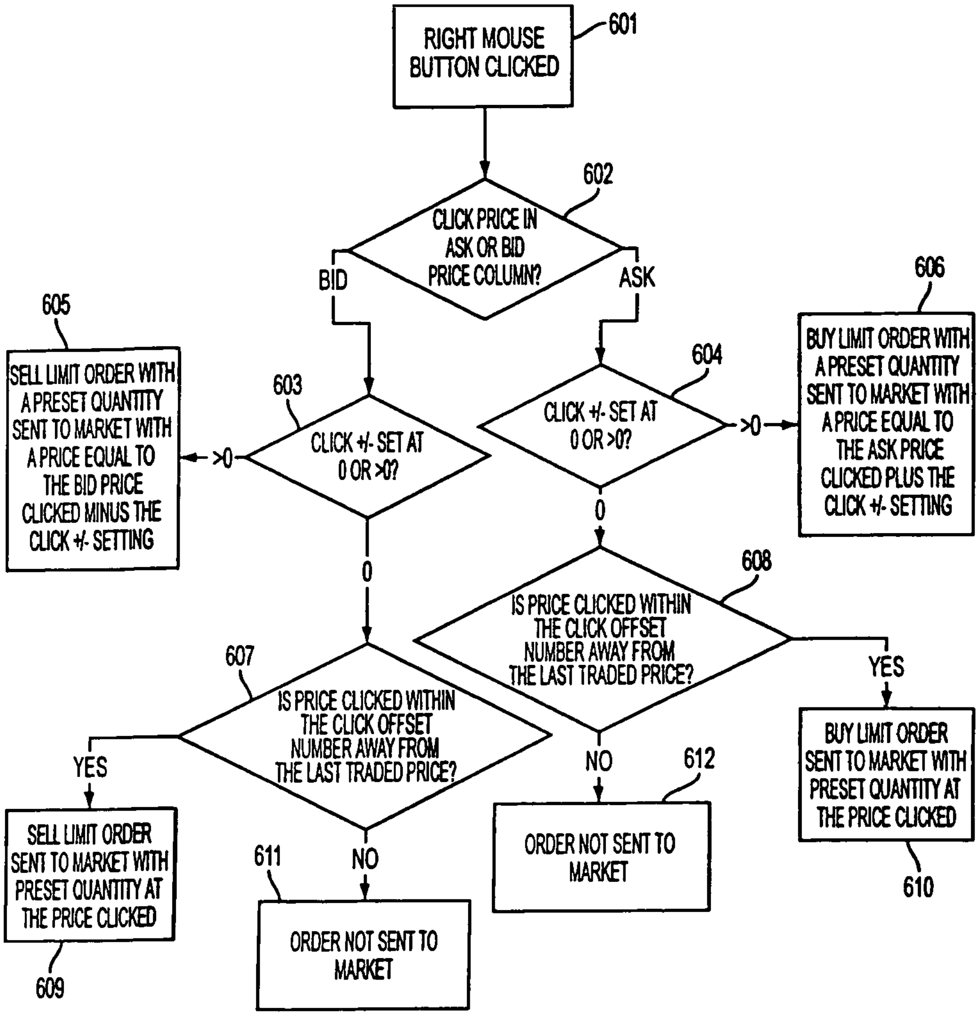
FIG. 6 is a flowchart illustrating the process of Click trading.

The following describes the use of the Click Offset feature of the present invention with reference to the flowchart of FIG. 6. If in step 603 it is determined that the Click +/− value is 0, the system moves to step 607. Similarly, if in step 604 it is determined that the Click +/− value is 0, the system moves to step 608. In each of steps 607 and 608, the system determines whether to allow the buy or sell trade order to be sent to the market. In these steps, the system determines whether the price clicked is within the Click Offset value away from the last trade price of the commodity. If, in step 607, the system determines that the price clicked is within the Click Offset value away from the last trade price of the commodity, then, in step 609 (see Eq. 6), it creates a sell limit order for the preset quantity at the Bid price clicked. If not, then, in step 611 (see Eq. 4), no trade order is sent to the market and the trader's attempt to place a trade is prevented. Similarly, if in step 608, the system determines that the price clicked is within the Click Offset value away from the last trade price of the commodity, then, in step 610 (see Eq. 5), it creates a buy limit order for the preset quantity at the Ask price clicked. If not, then, in step 612 (see Eq. 3), no trade order is sent to the market and the trader's attempt to place a trade is prevented.

Next, placement of dime trades under the present invention, as opposed to click trades, is described with reference to the screen display of FIG. 7 and the flowchart of FIG. 8. Dime trading allows traders to join the market at a value above or below the best bid or ask by a specified number. Using Dime +/−, a trader can enter orders into the market that will not be filled until an equal match met the order in the market. The trader selects the quantity as he did when click trading, and enters the tick amount in the "Dime +/−" field. A setting of zero ("0") ticks will enter an order for the price clicked. A tick setting of any amount greater than or less than zero ("0") sends an order to the market for the price clicked plus (minus if selling) the Dime +/− setting. If the trader clicked on the Bid order column, a bid would be sent, while a click on the Ask column would send an ask order. This type of trading may be utilized to join the market or even to move the prevailing market prices up or down.

The following equations are used to exemplify how the system would determine at what price an order should be placed when using Dime trading. The following abbreviations are used in these formulas: Ask Price clicked with Dime trading button=A, Bid Price clicked with Dime trading button=B, Dime +/− value=D, Quantity=Q, Buy limit order sent to the market=Bo and Sell limit order sent to the market=So.

$$Bo=(B+D)Q \quad \text{(Eq. 7)}$$

$$So=(A-D)Q \quad \text{(Eq. 8)}$$

Figure 7:
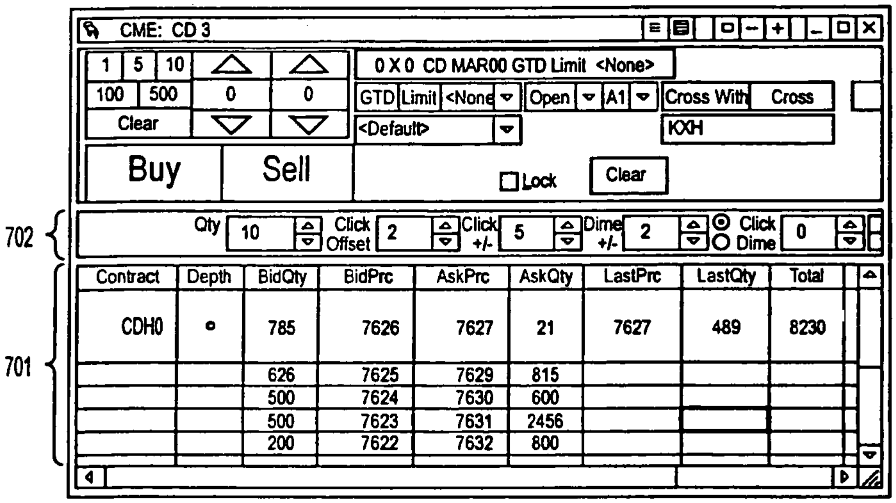
FIG. 7 illustrates an entire trading window screen display including the display of market depth in which the Dime trading feature is enabled.
Figure 8:
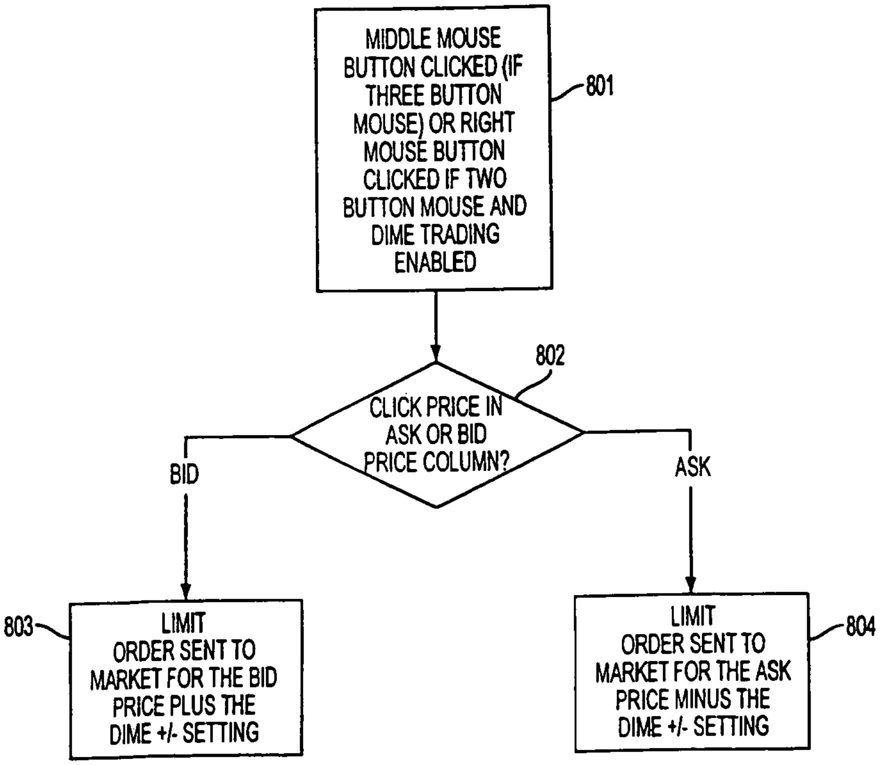
FIG. 8 is a flowchart illustrating the process of Dime trading.

Using the values shown in the screen display of FIG. 7, the placement of dime trades is now described using examples. In these examples, and as shown in area 702 of FIG. 7, the QTY is 10, the Dime +/− value and the Dime button has been selected. Suppose the trader wishes to join in the market with those wishing to buy a commodity at a certain price. In this screen, the trader might click in area 701 on 7622, which is four rows below the inside market bid price. This would send a buy order to the market for his previously entered quantity (10 in the screen display of FIG. 7) for a price of 7624 or better (up to two ticks above the clicked price). Nothing would be filled at this point. Rather, the orders would be placed in the market as a Bid limit order at a price of 7624 and would only be filled if an Ask order entered the market for a price of 7624 or better (lower).

Suppose that the Dime +/−was set to a negative number, for example −3. In this case, a click on 7622 in the BidPrc column would enter a Bid limit order for a price of 7619. None of these would be filled in the market until and unless the Ask orders enter the market for a price of 7619 or better (lower).

The process for placing dime trades in the present invention as described above are shown in the flowchart of FIG. 8. First, in step 801, the system determines whether a dime trade has been requested. This step connects with step 407 of FIG. 4. In one embodiment, as discussed above and as shown in box 801, determination that a dime trade is requested can be based, in part, on which mouse button was depressed. In step 802, the system determines whether the trader wants to join the market of buy orders or of sell orders for the commodity based upon whether a price has been clicked in the Bid column or in the Ask column. A click in the Bid column indicates that the trader is initiating a buy order and the system then moves to step 803. A click in the Ask column indicates that the trader is initiating a sell order and the system then moves to step 804. In step 803, the system creates a buy limit order at a price equal to the Bid price clicked plus the Dime +/− amount (see Eq. 7). The order is sent to the exchange. In step 804, the system creates a sell limit order at price equal to the Ask price clicked minus the Dime +/− amount (see Eq. 8). The order is sent to the exchange. In this way, the trader can easily join the market for a given commodity by entering orders into the market that will not be filled until an equal match met the order in the market.

Other features of the present invention, applicable to both click and to dime trading are now described. Reference is made to FIG. 3, and specifically in area 302, to the fields containing values, including the QTY 304, the Click Offset 305, the Click +/− 306 and the Dime +/− 307 fields. The values in these fields can be set by typing in the numbers through a keyboard or by clicking on the up and down arrows to increment or decrement the value within the corresponding field. In the present invention, however, there is a third way to adjust the values in these fields which furthers the goal of reducing the amount of time required to place trade orders. The values in these fields can be adjusted by simply positioning the mouse pointer in the desired field and clicking a button. In the preferred embodiment of the invention, a click of the left mouse button causes the value in the field the increment by 1 and a click of the right mouse button causes the value to decrement by 1. This functionality is accomplished by including programming to cause clicks of certain of the mouse buttons to provide the above-described incrementing only when the mouse is detected above these fields.

In one embodiment of the present invention, a two-button mouse is used by the trader to make selections on the screen and initiate trade orders. In this case, as discussed above, the user selects whether he wishes to be initiating click trades or dime trades by selecting the appropriate button in area 302. Once selected, the right button of the mouse is used to initiate as many click or dime trades as the trader desires, depending on which mode is selected, by clicking on an Ask or Bid price in area 303. In another embodiment of the invention, a three-button mouse is used by the trader. This eliminates the need to select either the click button or the dime button since both types of trades can be executed from the mouse at any given time. Using a three-button mouse, and with the mouse pointer positioned over a tradeable cell as described above, a trader could place a dime trade with a single click of the middle mouse button and place a click trade with a single click of the right mouse button. This embodiment of the present invention also furthers the goal of reducing the amount of time required to place trade orders since it eliminates the time necessary to switch between click and dime modes of trading.

Figure 9:
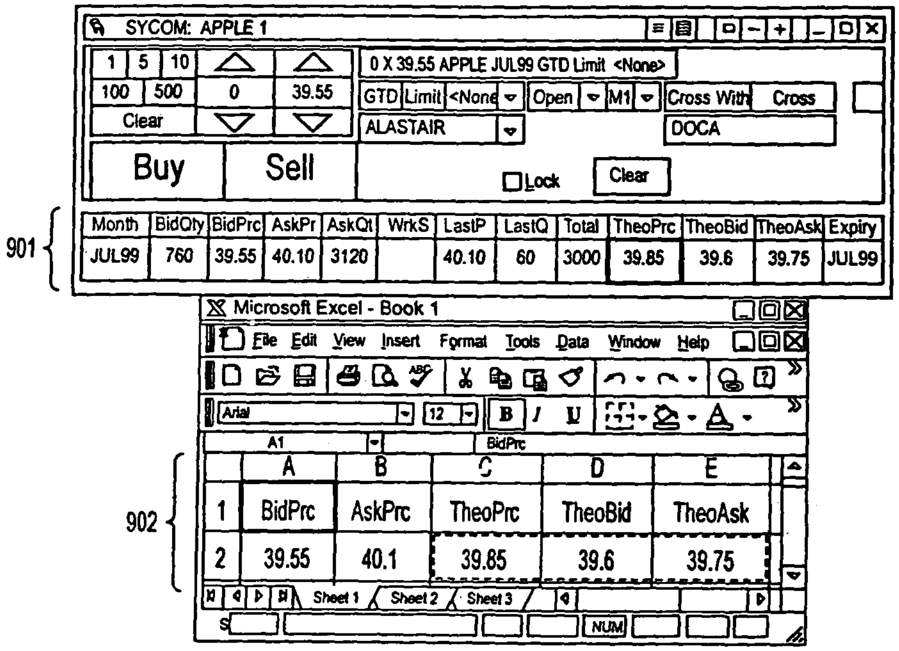
FIG. 9 is a screen display illustrating the incorporation of theoretical values into the system of the present invention.

Another feature of the present invention involves the use of theoretical trading prices as well as theoretical ask and bid prices. Such theoretical values can assist the trader in deciding whether to place trades and, in the present invention, can be used to prevent the trader from placing trades that are outside of the parameters defined by the theoretical values. These theoretical values are pre-determined and may be calculated by an external program or algorithm. The values are imported into the present system automatically or can be entered by the trader. FIG. 9 shows a screen display where, in area 902, values generated from a spreadsheet 902 are imported into the present system and shown in area 901. A screen button "Theo" (not shown) can be clicked to enable the use of the Theoretical Value in click trading. Thus, the trader's click trades would then be restricted by this value and no order would be sent that was not as good or better than the theoretical value. This value would be applied irrespective of whether the trader attempted to buy or sell. Thus, if the theoretical value was 102 and the trader attempted to click trade in the BidPrc column at 101, no order would be sent because the clicked value was worse than the theoretical value. Clicks on 102, 103, 104 or higher in the BidPrc column would be allowed because these would send sell orders as good as or better than the theoretical value.

Separate Theoretical Bid and Ask prices can also be used. This feature can be enabled by clicking on a screen button "B/A" (Bid/Ask—not shown). A separate theoretical value could be established for each bid and ask in accordance with predetermined algorithms based on various parameters. This is shown in FIG. 9 as TheoBid and TheoAsk. Separate bid and ask theoretical values can also be established for each row in the market depth. Each attempted bid or ask order would be checked against each corresponding theoretical bid or ask value. If the clicked price is as good or better than the corresponding Bid or Ask theoretical value, only then will the order be sent.

An additional feature of the present invention relating to the use of theoretical values is the ability to modify "edge". Traders may edge their trades away from the theoretical values described above. When either the Theo or B/A screen buttons are clicked enabled, a white field (not shown) appears in a box adjacent to "Theo" and "B/A." Traders can input a number of ticks here which allows them to prevent orders from being placed that are not better than the corresponding theoretical value by the amount of ticks entered. For example, with a 12.2 theoretical value, a 12.6 market bid, and an edge value of 4 ticks, a trader's order to sell at the market bid price will pass the edge test and the trade order will be sent. But, if the bid moved one tick lower to 12.5, an attempt to sell would fail the edge test, because only 3 ticks of edge would be made on the trade and, thus, no trade order would be sent. Edge trading can also be used with the Click +/− setting. A trader who sets the Click +/− value to 4 ticks will construct a bid 4 ticks higher than the offer or an offer 4 ticks lower than the bid. If this constructed price fails the edge test, the order will not be sent.

It should be understood that the above description of the invention and specific examples, while indicating preferred embodiments of the present invention, are given by way of illustration and not limitation. Many changes and modifications within the scope of the present invention may be made without departing from the spirit thereof, and the present invention includes all such changes and modifications.

We claim:

1. A method of placing a trade order in an electronic trading environment, the method comprising:

displaying an inside market for a tradeable object via a display associated with a computing device, the inside market having a best bid and a best ask available for the tradeable object at an electronic exchange;

receiving a preset trade order parameter for changing a price of a trade order to be submitted to the electronic exchange, the trade order parameter received via an input device associated with the computing device;

receiving a user command for entering a trade order for the tradeable object via the input device, the user command identifying a price for the trade order outside of the inside market;

in response to the user command, determining a trade order price according to at least the preset trade order parameter and the identified price via the computing device, wherein the trade order price is different than the identified price; and submitting the trade order for the tradeable object at the trade order price to the electronic exchange.

2. The method of claim 1, where the trade order comprises any one of a click order and a dime order.

3. The method of claim 1, where a type for the trade order is selectable between a click order and a dime order according to the user command.

4. The method of claim 1, where when the trade order comprises an order to sell the tradeable object, the trade order price comprises the identified price less the preset trade order parameter.

5. The method of claim 1, where when the trade order comprises an order to buy the tradeable object, the trade order price comprises the identified price plus the preset trade order parameter.

6. The method of claim 1, further comprising:

receiving a click offset parameter via the input device, the click offset parameter identifying a range of values from a last traded price of the tradeable object for submitting orders to the electronic exchange.

7. The method of claim 6, where the trade order is submitted in response to the trade order price being within the click offset parameter.

8. The method of claim 1, further comprising:

receiving a theoretical price for the tradeable object, the theoretical price identifying a threshold for submitting orders to the electronic exchange.

9. The method of claim 8 where the trade order is submitted in response to the trade order price being equal to or better than the theoretical price.

10. The method of claim 9, where the theoretical price is adjustable according to an edge parameter amount, the theoretical price being adjusted downward according to a comparison to the ask price and being adjusted upward according to a comparison to the bid price.

11. A computer readable medium having computer executable instructions stored thereon, which when executed cause a computing device to carry out a method comprising:

displaying an inside market for a tradeable object via a display associated with the computing device, the inside market having a best bid and a best ask available for the tradeable object at an electronic exchange;

receiving a preset trade order parameter for a range of prices from the inside market for submitting orders to the electronic exchange, the trade order parameter received via an input device associated with the computing device;

receiving a user command for entering an order for the tradeable object via the input device, the user command identifying a price for the order outside of the inside market;

in response to the user command, determining a trade order price according to at least the preset trade order parameter and the identified price via the computing device; and submitting the order for the tradeable object at the trade order price to the electronic exchange.

12. The computer readable medium of claim 11, where a type of the trade order is selectable between a click order and a dime order according to the user command.

13. The computer readable medium of claim 11, where when the trade order comprises an order to sell the tradeable object, the trade order price comprises a bid determined according to the identified price less the preset trade order parameter and when the trade order comprises an order to buy the tradeable object, the trade order price comprises an ask determined according to the identified price plus the trade order parameter.

14. The computer readable medium of claim 11, where the trade order is submitted only in response to the trade order being within an offset parameter from a last traded price of the tradeable object.

15. The computer readable medium of claim 11, where the preset trade order parameter comprises a theoretical price for the tradeable object, the theoretical price identifying a threshold for submitting orders to the electronic exchange.

16. The computer readable medium of claim 15, where the order is submitted in response to the trade order price being equal to or better than the theoretical price.

* * * * *